United States Patent
Michl et al.

(10) Patent No.: US 10,604,608 B2
(45) Date of Patent: Mar. 31, 2020

(54) METHOD FOR PRODUCING AN AQUEOUS BINDER

(71) Applicant: BASF SE, Ludwigshafen am Rhein (DE)

(72) Inventors: Kathrin Michl, Ludwigshafen (DE); Theo Smit, Heidelberg (DE); Holger Schilling, Birkenau (DE); Dieter Faul, Niederkirchen (DE)

(73) Assignee: BASF SE, Ludwigshafen am Rhein (DE)

(*) Notice: Subject to any disclaimer, the term of this patent is extended or adjusted under 35 U.S.C. 154(b) by 136 days.

(21) Appl. No.: 15/767,211

(22) PCT Filed: Oct. 21, 2016

(86) PCT No.: PCT/EP2016/075349
§ 371 (c)(1),
(2) Date: Apr. 10, 2018

(87) PCT Pub. No.: WO2017/076661
PCT Pub. Date: May 11, 2017

(65) Prior Publication Data
US 2019/0071527 A1    Mar. 7, 2019

(30) Foreign Application Priority Data

Nov. 6, 2015  (EP) .................................... 15193429

(51) Int. Cl.
| | | |
|---|---|---|
| *C08F 220/06* | (2006.01) | |
| *C08F 4/40* | (2006.01) | |
| *C08F 120/06* | (2006.01) | |
| *C08F 220/08* | (2006.01) | |
| *C08K 3/30* | (2006.01) | |
| *C08K 3/32* | (2006.01) | |
| *C08K 5/17* | (2006.01) | |

(52) U.S. Cl.
CPC .............. *C08F 220/06* (2013.01); *C08F 4/40* (2013.01); *C08F 120/06* (2013.01); *C08F 220/08* (2013.01); *C08K 3/30* (2013.01); *C08K 3/32* (2013.01); *C08K 5/17* (2013.01); *C08K 2003/309* (2013.01)

(58) Field of Classification Search
CPC . C08G 18/6216; C09D 5/4411; C08F 222/02; C08F 220/06
See application file for complete search history.

(56) References Cited

U.S. PATENT DOCUMENTS

| | | | | |
|---|---|---|---|---|
| 5,294,686 A | * | 3/1994 | Fiarman | C08F 2/38 526/233 |
| 5,661,213 A | * | 8/1997 | Arkens | C08F 8/14 524/555 |
| 2009/0160077 A1 | * | 6/2009 | Aulenta | C08K 5/17 264/119 |

FOREIGN PATENT DOCUMENTS

| | | |
|---|---|---|
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 075 820 A1 | 4/1983 |
| EP | 0 583 086 A1 | 2/1994 |
| EP | 0 651 088 A1 | 5/1995 |
| EP | 0 771 328 | 5/1997 |
| EP | 0 882 074 | 12/1998 |
| EP | 0 882 093 | 12/1998 |
| EP | 0 882 094 | 12/1998 |
| EP | 1 739 128 A1 | 1/2007 |
| EP | 2 072 578 A1 | 6/2009 |
| EP | 2 177 563 A1 | 4/2010 |
| WO | WO 97/45461 A1 | 12/1997 |
| WO | WO 99/09100 A1 | 2/1999 |
| WO | WO 2013/024084 A1 | 2/2013 |

OTHER PUBLICATIONS

International Search Report dated Jan. 30, 2017, in PCT/EP2016/075349, filed Oct. 21, 2016.
U.S. Appl. No. 15/301,842, filed Oct. 4, 2016, US 2017-0174849 A1, Lucia Jimenez Garcia, et al.
U.S. Appl. No. 15/321,116, filed Dec. 21, 2016, US 2017-0152333 A1, Matthias Zorn, et al.
U.S. Appl. No. 15/574,714, filed Nov. 16, 2017, Hermann Seyffer, et al.
U.S. Appl. No. 15/574,755, filed Nov. 16, 2017, Hermann Seyffer, et al.
U.S. Appl. No. 15/531,303, filed May 26, 2017, US 2017-0355916 A1, Irene Troetsch-Schaller, et al.
U.S. Appl. No. 15/746,920, filed Jan. 23, 2018, Matthias Zorn.

* cited by examiner

*Primary Examiner* — Mark S Kaucher
(74) *Attorney, Agent, or Firm* — Oblon, McClelland, Maier & Neustadt, L.L.P.

(57) ABSTRACT

Process for producing an aqueous binder comprising at least one polycarboxylic acid, at least one compound having at least two hydroxyl groups, and at least one phosphorus compound.

19 Claims, No Drawings

METHOD FOR PRODUCING AN AQUEOUS BINDER

Subject matter of the present invention is a process for producing an aqueous binder comprising at least one polycarboxylic acid A, at least one organic compound B which comprises at least two hydroxyl groups (polyol B), and at least one phosphorus compound C, which comprises carrying out radical polymerization in a first process step of
≥50 and ≤100 parts by weight of at least one α,β-monoethylenically unsaturated monocarboxylic or dicarboxylic acid and/or the anhydride thereof (monomer A1), and
≥0 and ≤50 parts by weight of at least one other ethylenically unsaturated compound (monomer A2), which is copolymerizable with the monomers A1,
wherein the total amounts of the monomers A1 and A2 add up to 100 parts by weight [total monomer amount], in an aqueous medium in the presence of ≥0.5 and ≤50 wt %, based on the total monomer amount, of at least one inorganic hydrogen sulfite salt, to give the polycarboxylic acid A, thereafter, in a second process step in the aqueous solution of the polycarboxylic acid A obtained (polycarboxylic acid solution), reducing the amount of free, unreacted hydrogen sulfite, calculated as sodium hydrogen sulfite ($NaHSO_3$), to an amount ≤1000 ppm, based on the polycarboxylic acid solution, and only thereafter, in a third process step, adding the phosphorus compound C either to the polycarboxylic acid solution, to the mixture of polycarboxylic acid solution and polyol B, and/or during the mixing of polycarboxylic acid solution and polyol B.

The present invention likewise comprises the aqueous binders obtainable by the process of the invention, and also their use for producing shaped articles from granular and/or fibrous substrates.

Using aqueous binder systems comprising a polymeric polycarboxylic acids and polyols as formaldehyde-free, thermally curable binders for producing fiberboard panels, fibrous nonwovens or else chipboard panels is a concept familiar to the skilled person (in this regard see, for example, EP-A 882074, EP-A 882093, EP-A 882094, EP-A 583086 or EP-A 651088).

Specifications such as EP-A 583086 or EP-A 651088 disclose the effect of phosphorus-comprising compounds as accelerators in the thermal curing of the aqueous binders comprising polymeric polycarboxylic acids and polyols, and the improvement they bring about in the mechanical properties, such as the wet strength, for example, of the shaped articles obtained from the granular and/or fibrous substrates.

From U.S. Pat. No. 5,294,686 it is known that alkali metal salt hypophosphites are also used as so-called chain transfer compounds in the preparation of polymeric polycarboxylic acids, acting to lower the molecular weight of the polymeric polycarboxylic acids obtained in the polymerization, and hence to lower the viscosity of the polycarboxylic acid solutions prepared using them.

It is known from EP-A 1739128, moreover, that phosphorus-comprising compounds, especially alkali metal salt hypophosphites, are used both for the preparation of polymeric polycarboxylic acid of low molecular mass and also to effect acceleration for the subsequent curing reaction. If utilized dually (chain transfer agent/reaction accelerator), however, the relatively expensive alkali metal salt hypophosphites must be used in amounts of up to 40 wt %, based on the total monomer amount.

For reasons of cost, however, in the preparation of polymeric polycarboxylic acids of low molecular mass by radical polymerization of ethylenically unsaturated carboxylic acids, such as, in particular, acrylic acid, methacrylic acid, and maleic acid and/or the anhydride thereof in an aqueous medium, it is advantageous to use other chain transfer compounds, particularly inorganic hydrogen sulfite compounds. Our own investigations, though, demonstrate that the blending of aqueous solutions of polymeric polycarboxylic acids, prepared using inorganic hydrogen sulfite compounds, with polyols and phosphorus-comprising compounds, especially alkali metal salt hypophosphites, is accompanied by adverse affects on the aqueous product mixtures, such as, in particular, unwanted clouding and a nuisance odor of hydrogen sulfide. These disruptive effects occur in a particularly pronounced form especially when the pH of the aqueous mixture is <5.

It was an object of the present invention, therefore, to provide an aqueous binder comprising a polycarboxylic acid, a polyol, and a phosphorus compound, the polycarboxylic acid therein having been prepared by radical polymerization of at least one α,β-monoethylenically unsaturated monocarboxylic or dicarboxylic acid and/or the anhydride thereof in an aqueous medium in the presence of an inorganic hydrogen sulfite salt, this binder, when blended with a phosphorus compound, exhibiting significantly reduced clouding or none and having a significantly reduced hydrogen sulfide odor or none.

The object has been achieved by the aqueous binders obtainable in accordance with the process defined at the outset.

In accordance with the invention, in the first process step, ≥50 and ≤100 parts by weight, advantageously ≥85 and ≤100 parts by weight, and especially advantageously 100 parts by weight of at least one monomer A1, and ≥0 and ≤50 parts by weight, advantageously ≥0 and ≤15 parts by weight, and especially advantageously 0 parts by weight of at least one monomer A2, are radically polymerized to give the polycarboxylic acid A, the total amounts of the monomers A1 and A2 adding up to 100 parts by weight [total monomer amount], in an aqueous medium in the presence of ≥0.5 and ≤50 wt %, based on the total monomer amount, of at least one inorganic hydrogen sulfite salt.

The monomers A1 are α,β-monoethylenically unsaturated, especially $C_3$ to $C_6$, preferably $C_3$ or $C_4$, monocarboxylic or dicarboxylic acids, and also the fully or partly neutralized, water-soluble salts thereof, more particularly their alkali metal salts or ammonium salts. Examples include acrylic acid, methacrylic acid, ethylacrylic acid, itaconic acid, allylacetic acid, crotonic acid, vinylacetic acid, fumaric acid, maleic acid, 2-methylmaleic acid, and also monoesters of ethylenically unsaturated dicarboxylic acids, such as monoalkyl maleates of $C_1$ to $C_8$ alcohols, and also the ammonium, sodium or potassium salts of the aforesaid acids. The monomers A1 also, however, include the anhydrides of corresponding α,β-monoethylenically unsaturated dicarboxylic acids, such as maleic anhydride or 2-methymaleic anhydride, for example. The monomer A1 is preferably selected from the group comprising acrylic acid, methacrylic acid, crotonic acid, fumaric acid, maleic acid, maleic anhydride, 2-methylmaleic acid and itaconic acid. Used with particular advantage as monomers A1 in accordance with the invention, however, are acrylic acid, methacrylic acid, maleic acid, maleic anhydride and/or itaconic acid.

Contemplated as monomers A2 are all ethylenically unsaturated monomers which differ from but are copolymerizable with the monomers A1. By way of example, monomers A2 include vinylaromatic compounds, such as styrene, α-methylstyrene, o-chlorostyrene or vinyltoluenes, vinyl halides, such as vinyl chloride or vinylidene chloride, esters of vinyl alcohol and monocarboxylic acids having 1 to 18 carbon atoms, preferably 2 to 12 carbon atoms, such as vinyl acetate, vinyl propionate, vinyl n-butyrate, vinyl laurate, and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, and n-hexyl vinyl ether, esters of α,β-monoethylenically unsaturated monocarboxylic and dicarboxylic acids having preferably 3 to 6 carbon atoms, such as, in particular, acrylic acid, methacrylic acid, maleic acid, fumaric acid, and itaconic acid, with alkanols having generally 1 to 12, preferably 1 to 8, and more particularly 1 to 4 carbon atoms, such as, particularly, methyl, ethyl, n-butyl, isobutyl, pentyl, hexyl, heptyl, octyl, nonyl, decyl, and 2-ethylhexyl acrylate and methacrylate, dimethyl or di-n-butyl fumarate and dimethyl or di-n-butyl maleate, nitriles of α,β-monoethylenically unsaturated carboxylic acids, such as acrylonitrile, methacrylonitrile, fumaronitrile, maleonitrile, and also $C_{4-8}$ conjugated dienes, such as 1,3-butadiene (butadiene) and isoprene. The aforesaid monomers form generally 50 wt %, preferably 80 wt %, and especially preferably 90 wt % of the total amount of all monomers A2, and therefore represent the principal monomers A2. With preference in accordance with the invention, the polymer A comprises as principal monomer A2 an ester of acrylic acid or methacrylic acid with a $C_1$ to $C_{12}$ alcohol, more particularly methyl acrylate, ethyl acrylate, n-butyl acrylate, 2-ethylhexyl acrylate or methyl methacrylate, a vinylaromatic compound, more particularly styrene, a nitrile of an α,β-monoethylenically unsaturated carboxylic acid, more particularly acrylonitrile, and/or a vinyl ester of a $C_2$ to $C_{12}$ monocarboxylic acid, in copolymerized form.

Additionally contemplated as monomers A2 to a minor degree are those ethylenically unsaturated monomers which comprise either at least one sulfonic acid group and/or the corresponding anion thereof, or at least one amino, amido, ureido or N-heterocyclic group and/or ammonium derivatives thereof that are alkylated or protonated on the nitrogen. Examples include acrylamide and methacrylamide, and also vinylsulfonic acid, 2-acrylamido-2-methylpropanesulfonic acid, styrenesulfonic acid, and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazolin-2-onyl)ethyl methacrylate. The aforesaid monomers A2 are used in general in amounts ≤10 wt %, preferably ≤8 wt %, and more particularly ≤5 wt %, based in each case on the total amount of monomers A2. A preferred monomer used is acrylamide and/or methacrylamide in an amount of ≥0.5 and ≤4 wt %, based on the total amount of monomers A2.

Monomers A2 which customarily increase the internal strength of the films formed from a polymer matrix normally comprise at least one epoxy group, at least one carbonyl group, or at least two nonconjugated ethylenically unsaturated double bonds. Examples of such monomers are monomers comprising two vinyl radicals, monomers comprising two vinylidene radicals, and monomers comprising two alkenyl radicals. Particularly advantageous in this context are the diesters of dihydric alcohols with α,β-monoethylenically unsaturated monocarboxylic acids, of which acrylic acid and methacrylic acid are preferred. Examples of monomers of this kind comprising two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The aforesaid monomers A2 are used in general in amounts ≤10 wt %, preferably ≤5 wt %, and more particularly ≤2 wt %, based in each case on the total amount of monomers A2.

Preferred for use as monomer A2, however, are methyl acrylate, ethyl acrylate, n-butyl acrylate, 2-ethylhexyl acrylate, methyl methacrylate and/or styrene.

Used preferably for the polymerization are ≥85 and ≤100 wt % of at least one monomer A1, and ≥0 and ≤15 wt % of at least one monomer A2. Used with particular advantage for the polymerization are ≥85 and ≤100 wt % of acrylic acid, methacrylic acid, maleic acid, maleic anhydride and/or itaconic acid, especially advantageously acrylic acid, and also acrylic acid and maleic anhydride, and ≥0 and ≤15 wt % of methyl acrylate, ethyl acrylate, n-butyl acrylate, 2-ethylhexyl acrylate, methyl methacrylate and/or styrene.

Used especially advantageously for the polymerization, however, are exclusively monomers A1, with acrylic acid, methacrylic acid, maleic acid, maleic anhydride and/or itaconic acid being preferred, and acrylic acid, or mixtures of acrylic acid and maleic anhydride, being particularly preferred.

For the process of the invention it is essential that the radical polymerization of the monomers A1 and A2 takes place in an aqueous medium in the presence of at least one inorganic hydrogen sulfite salt.

For the purposes of this specification, a hydrogen sulfite salt is understood to comprehend those compounds which comprise at least one hydrogen sulfite ion ($HSO_3^-$) and or which are capable of forming such a hydrogen sulfite ion in an aqueous medium. This includes all alkali metal, alkaline earth metal, and heavy metal hydrogen sulfites, such as more particularly sodium hydrogen sulfite ($NaHSO_3$), potassium hydrogen sulfite ($KHSO_3$), magnesium hydrogen sulfite ($Mg(HSO_3)_2$) and/or calcium hydrogen sulfite ($Ca(HSO_3)_2$), and also metal disulfites, especially alkali metal disulfites, such as sodium disulfite ($Na_2S_2O_5$) or potassium disulfite ($K_2S_2O_5$).

Given that in an aqueous medium the equilibrium of sulfite ions is as follows

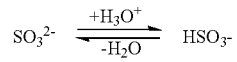

the compounds capable of forming hydrogen sulfite ions also include the water-soluble metal salt sulfites, such as sodium sulfite ($Na_2SO_3$) and/or potassium sulfite ($K_2SO_3$), for example.

With advantage, however, sodium hydrogen sulfite and potassium hydrogen sulfite are used in accordance with the invention, with sodium hydrogen sulfite being especially preferred.

In accordance with the invention, the total amount of the inorganic hydrogen sulfite salt can be included in the initial charge in the aqueous polymerization medium before the polymerization reaction is initiated. An alternative possibility is to include, optionally, only a portion of the hydrogen sulfite salt in the initial charge in the aqueous polymerization medium before the polymerization reaction is initiated, and then to add the total amount or any remaining portion at the rate at which it is consumed, discontinuously in one or more portions, or continuously with constant or changing volume flow rates. With advantage, the total amount of the hydrogen sulfite salt is added during the polymerization reaction in parallel with the metering of the monomers A1 and monomers A2, with a constant volume flow rate.

In accordance with the invention, the amount of inorganic hydrogen sulfite salt is ≥0.5 and ≤50 wt %, advantageously ≥5 and ≤40 wt %, and especially advantageously ≥10 and ≤30 wt %, based in each case on the total monomer amount.

Advantageously in accordance with the invention, the amount of inorganic hydrogen sulfite salt is selected such that the resulting polycarboxylic acid A has a weight-average molecular weight of ≤80 000 g/mol, advantageously ≥1000 and ≤50 000 g/mol, and especially ≥2000 and ≤30 000 g/mol. For the purposes of the present specification, the weight-average molecular weights are to be determined by means of gel permeation chromatography, using polyacrylic acid standards for calibration.

The radical polymerization of the monomers A1 and A2 takes place in particular by the method of radical solution polymerization in an aqueous medium.

The method of radically initiated solution polymerization is familiar to the skilled person and takes place in particular in water or in a water/solvent mixture (see, for example, A. Echte, Handbuch der Technischen Polymerchemie, chapter 6, VCH, Weinheim, 1993, or B. Vollmert, Grundriss der Makromolekularen Chemie, volume 1, E. Vollmert Verlag, Karlsruhe, 1988; L. Kotzeva, J. Polym. Sci. A-27, 1989 (4), pages 1325ff; C. Erbil et al., Polymer 41, 2000, pages 1391ff; C. Yang, X. Lu Yun, J. Polym. Sci. 75(2), 2000, pages 327ff; M. Sen et al., Polymer 40(9), 1999, pages 913ff; F. Wang et al., Anal. Chem. 68, 1996, pages 2477ff; J. Velada et al., Macromol. Chem. and Phys. 196, 1995, pages 3171ff; J. M. Cowie, C., Br. Polym. J. 9, 1977, pages 241ff; J. Velada et al., Polymer Degradation and Stability 52, 1996, pages 273ff; A. Horta et al., Makromol. Chem., Rapid Commun. 8, 1987, pages 523ff; T. Hirano et al., J. Polym. Sci. A-38, 2000, pages 2487ff; B. E. Tate, Adv. Polymer Sci. 5, 1967, pages 214ff). Where this polymerization takes place in a water/solvent mixture, the organic solvent is generally removed after the end of the polymerization at least partially, advantageously to an extent ≥50 wt % or ≥90 wt %, and especially advantageously completely. The methods for doing this are familiar to the skilled person.

Where organic solvents are used, the solvents selected are advantageously those which at 20° C. and under atmospheric pressure have an infinite miscibility with water, such as, for example, aliphatic $C_1$ to $C_5$ alcohols, such as especially methanol, ethanol, n-propanol or isopropanol, or aliphatic $C_1$ to $C_5$ ketones, such as especially acetone or butanone.

With particular advantage, the polymerization reaction takes place by radically initiated solution polymerization in an aqueous, solvent-free medium, more particularly in deionized water. The amount of water here is selected such that it is ≥40 and ≤900 wt %, advantageously ≥60 and ≤700 wt %, and especially advantageously ≥80 and ≤500 wt %, based in each case on the total monomer amount.

Accordingly, in a polymerization vessel, at least one portion of the deionized water and optionally at least one portion of the inorganic hydrogen sulfite salt and also optionally a portion of the monomers A1 and A2 are included in the initial charge before the polymerization reaction is initiated, and, under polymerization conditions, i.e., after the initiation of the polymerization reaction, any remaining portions of deionized water, and also the total amounts and any remaining portions of the inorganic hydrogen sulfite salt and of the monomers A1 and A2, are metered into the aqueous polymerization medium, discontinuously in one or more portions, or continuously with constant or changing volume flow rates. With particular advantage, however, at least a portion, advantageously ≥50 wt % and especially advantageously ≥75 wt %, of the monomers A1 and A2 is supplied continuously to the aqueous medium under polymerization conditions. Likewise with advantage, ≥50 wt %, especially advantageously ≥90 wt %, and with particular advantage the entirety of the inorganic hydrogen sulfite salt is added to the aqueous reaction mixture during the radical polymerization.

The radical polymerization is initiated by means of a radical polymerization initiator (radical initiator). The compounds in question may in principle be peroxides or azo compounds. Redox initiator systems are of course also contemplated. Peroxides which can be used are in principle inorganic peroxides, such as hydrogen peroxide or peroxodisulfates, such as the mono- or di-alkali metal or ammonium salts of peroxodisulfuric acid, such as, for example, the mono- and di-sodium, -potassium or -ammonium salts thereof, or organic peroxides, such as alkyl hydroperoxides, examples being tert-butyl, p-menthyl or cumyl hydroperoxide, and also dialkyl or diaryl peroxides, such as di-tert-butyl peroxide or di-cumyl peroxide. Finding use as azo compound are essentially 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). Oxidizing agents contemplated for redox initiator systems are essentially the peroxides stated above. As corresponding reducing agents it is possible to use sulfur compounds with a low oxidation state, such as alkali metal sulfites, as for example potassium and/or sodium sulfite, alkali metal hydrogen sulfites, as for example potassium and/or sodium hydrogen sulfite, alkali metal disulfites, as for example potassium and/or sodium disulfite, formaldehyde-sulfoxylates, as for example potassium and/or sodium formaldehyde-sulfoxylate, alkali metal salts, especially potassium and/or sodium salts, of aliphatic sulfinic acids, and alkali metal hydrogen sulfides, as for example potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid. In general the amount of the radical initiator used, based on the total monomer amount, is 0.01 to 5 wt %, preferably 0.1 to 3 wt %, and especially preferably 0.2 to 1.5 wt %.

If the inorganic hydrogen sulfite salts are to be used both as reducing agents for forming the radical initiator and as chain transfer compounds, the amount thereof must be calculated such that it is sufficient both to reduce the radical-forming oxidizing agent and to establish the desired molecular weight of the polycarboxylic acid A, while being within the claimed quantity range. In such an event—where there is a sufficient amount of inorganic hydrogen sulfite salt present in the aqueous polymerization medium—it is possible for the oxidizing agent used to be added on its own in order to initiate the polymerization reaction.

In accordance with the invention, the total amount of the radical initiator may be included in the initial charge in the aqueous polymerization medium before the polymerization reaction is initiated. It is, however, also possible to include, optionally, only a portion of the radical initiator in the initial charge in the aqueous polymerization medium before the polymerization reaction is initiated, and then, under polymerization conditions, to add the total amount or any remainder at the rate at which it is consumed, discontinuously in one or more portions, or continuously with constant or changing volume flow rates.

Initiation of the polymerization reaction refers to the starting of the polymerization reaction of the monomers present in the aqueous polymerization medium, following the formation of radicals by the radical initiator. The initiation of the polymerization reaction here may be accomplished by adding radical initiator and the monomers A1 and A2 to the aqueous polymerization medium under polymerization conditions. It is, however, also possible for a portion or the entirety of the radical initiator to be added to the aqueous polymerization medium, optionally comprising portions of the initial-charge inorganic hydrogen sulfite salts and also of the monomers A1 and A2, under conditions not suitable for triggering a polymerization reaction, such as at low temperature, for example, and thereafter to establish polymerization conditions in the aqueous polymerization medium. By polymerization conditions here are meant, generally, those temperatures and pressures under which the radically initiated polymerization proceeds at a sufficient polymerization rate. They are dependent in particular on the radical initiator used. Advantageously, nature and amount of the radical initiator, polymerization temperature, and polymerization pressure are selected such that the radical initiator has a half-life <3 hours, advantageously <1 hour, and especially advantageously <0.5 hour, while always providing sufficient initiating radicals to initiate and maintain the polymerization reaction.

The reaction temperature contemplated for the radically initiated polymerization of the invention spans the entire range from 0 to 170° C. Generally speaking, here, temperatures of 50 to 120° C., frequently 60 to 110° C., and often 70 to 100° C. are employed. The radically initiated polymerization of the invention may be carried out at a pressure less than, equal to or greater than 1 atm (atmospheric pressure=1.01325 bar absolute), and so the polymerization temperature may exceed 100° C. and may be up to 170° C. In that case the pressure may adopt values of 1.2, 1.5, 2, 5, 10 or 15 bar (absolute) or even higher. If the polymerization reaction is carried out under subatmospheric pressure, then pressures of 950 mbar, frequently of 900 mbar, and often of 850 mbar (absolute) are established. The radically initiated polymerization of the invention is conducted advantageously at 1 atm or at a higher pressure in the absence of oxygen, under an inert gas atmosphere, for example, such as under nitrogen or argon, for example.

An essential point is that in the process of the invention, besides the aforementioned substances for use, it is also possible to employ further customary components such as, for example, acids, bases or buffer systems for setting the pH, such as sulfuric acid, sodium hydroxide solution or ammonia solution, for example; extenders, such as polysaccharides, for example; or complexing agents for the binding of heavy metal ions; or heavy metal complexes as catalysts for the formation of radicals.

In one advantageous embodiment, the polymerization reaction takes place by means of unneutralized or only partly neutralized (<50 mol %) monomers A1 at a pH of the aqueous polymerization medium <5, advantageously ≤4, and especially advantageously ≤3. pH measurement or pH monitoring in this case takes place directly in the aqueous polymerization medium at polymerization temperature, optionally by means of a calibrated high-temperature pH electrode, such as an InPro® 325X from Mettler Toledo, for example.

The process of the invention takes place with particular advantage when the monomers A1 and A2 are reacted in the first process step up to a conversion of ≥98 wt %, advantageously ≥99 wt %, and especially advantageously ≥99.5 wt %. Determination of the monomer conversion is familiar to the skilled person and is accomplished in particular by methods of reaction calorimetry. Frequently it is advantageous if the aqueous polymerization mixture obtained after the end of the polymerization reaction is subjected to aftertreatment to reduce the residual monomer content. In this case the aftertreatment takes place either chemically, by completing the polymerization reaction by using a more effective radical initiator system (known as post polymerization), for example, and/or physically, as for example by stripping of the aqueous polymerization mixture with steam or inert gas. Corresponding chemical and/or physical methods are familiar to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115]. The combination of chemical and physical aftertreatment here offers the advantage that as well as the unconverted monomers A1 and A2, other disruptive volatile organic constituents (known as the VOCs or volatile organic compounds) are also removed from the aqueous polymerization mixture.

After the end of the polymerization reaction and after optional aftertreatment, the aqueous polymerization mixture obtained may be adjusted to a solids content ≥30 and ≤70 wt % by addition or removal of water.

Essential to the invention, however, is that the amount of free, unreacted hydrogen sulfite in the resulting polycarboxylic acid solution, calculated as sodium hydrogen sulfite, is reduced to an amount ≤1000 ppm, based on the polycarboxylic acid solution, before the phosphorus compound C is added. In this case the amount of free, unreacted hydrogen sulfite is determined by means of a 0.01 M iodine solution with starch as the indicator.

Methods suitable in principle for reducing the amount of free, unreacted hydrogen sulfite are all those which reduce the amount of free, unreacted hydrogen sulfite, such as chemical and/or physical methods in particular.

A chemical method contemplated is, in particular, the addition of corresponding oxidizing agents, such as inorganic peroxides, such as hydrogen peroxide or peroxodisulfates, such as the mono- or di-alkali metal or -ammonium salts of peroxo disulfuric acid, such as, for example, the mono- and di-sodium, -potassium or -ammonium salts thereof, or organic peroxides, such as alkyl hydroperoxides, as for example tert-butyl, p-menthyl or cumyl hydroperoxide, and also dialkyl or diaryl peroxides, such as di-tert-butyl peroxide or dicumyl peroxide; inorganic peroxides are preferred here, and hydrogen peroxide is especially preferred. The reaction with hydrogen peroxide—as well as its high reactivity—has the further advantage in particular that no additional salt load is introduced into the aqueous binder. In this case the removal reaction may take place—depending on the reactivity of the oxidizing agent—at room temperature (20 to 25° C.) or at elevated temperature. The reaction normally takes place under atmospheric pressure, though it is also possible for the reaction to be carried out at higher pressures or else even at lower pressures.

In the second process step, the polycarboxylic acid solution advantageously has a pH <5, particularly advantageously ≤4, and especially advantageously ≤3.

A physical method contemplated in particular is the stripping of the polycarboxylic acid solution with an inert gas, such as especially steam or nitrogen, with steam being particularly preferred. Given that hydrogen sulfite ions in an aqueous medium, especially at a pH<6, are able to enter into the following equilibrium reactions,

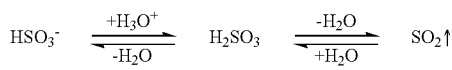

the hydrogen sulfite ions can be removed from the polycarboxylic acid solution by stripping of the sulfur dioxide. It may therefore be particularly advantageous and efficient to reduce the amount of hydrogen sulfite ions by parallel chemical reaction and physical stripping.

It is essential to the invention that only after the reduction in the hydrogen sulfite content, the phosphorus compound C, in a third process step, is added either to the polycarboxylic acid solution directly, to the mixture of polycarboxylic acid solution and polyol B, and/or during the mixing of polycarboxylic acid solution and polyol B.

As polyol B it is possible in principle to use all organic compounds which have at least two hydroxyl groups. This polyol B may be a compound having a molecular weight ≤1000 g/mol or a polymeric compound having a molecular weight >1000 g/mol. Examples of polymeric compounds having at least 2 hydroxyl groups include polyvinyl alcohol, partially hydrolyzed polyvinyl acetate, homopolymers or copolymers of hydroxyalkyl acrylates or hydroxyalkyl methacrylates, such as hydroxyethyl acrylate and/or methacrylate or hydroxypropyl acrylate and/or methacrylate, for example, but also saccharide compounds, such as mono-, di-, oligo- or polysaccharide compounds, and derivatives thereof. Examples of further polymeric polyols B which can be used in accordance with the invention are found in references including WO 97/45461, page 3, line 3 to page 14, line 33.

Contemplated as polyol B with a molecular weight ≤1000 g/mol are all the organic compounds which have at least 2 hydroxyl groups and a molecular weight ≤1000 g/mol. Examples include ethylene glycol, 1,2-propylene glycol, glycerol, 1,2- and/or 1,4-butanediol, pentaerythritol, trimethylolpropane, sorbitol, sucrose, glucose, 1,2-, 1,3- and/or 1,4-dihydroxybenzene, 1,2,3-trihydroxybenzene, 1,2-, 1,3- and/or 1,4-dihydroxycyclohexane, and also, preferably an alkanolamine, such as a compound of the general formula (I)

Formula (I)

for example, in which $R^1$ is a hydrogen atom, a $C_1$ to $C_{10}$ alkyl group or a $C_2$ to $C_{10}$ hydroxyalkyl group, and $R^2$ and $R^3$ are a $C_2$ to $C_{10}$ hydroxyalkyl group.

With particular preference, $R^2$ and $R^3$ independently of one another are a $C_2$ to $C_5$ hydroxyalkyl group and $R^1$ is a hydrogen atom, a $C_1$ to $C_5$ alkyl group or a $C_2$ to $C_5$ hydroxyalkyl group.

Particular compounds of the formula (I) include diethanolamine, triethanolamine, diisopropanolamine, triisopropanolamine, methyldiethanolamine, butyldiethanolamine and/or methyldiisopropanolamine.

Examples of further polyols B which can be employed in accordance with the invention and have a molecular weight ≤1000 g/mol are likewise found in WO 97/45461, page 3, line 3 to page 14, line 33. Examples of further polyols B having a molecular weight ≤1000 g/mol and also >1000 g/mol are also found in WO 99/09100, page 13, line 29 to page 24, line 32. As a result of being referenced expressly, the stated polyols B are regarded as an integral part of this specification.

The polyol B is preferably an alkanolamine which is selected from the group comprising diethanolamine, triethanolamine, diisopropanolamine, triisopropanolamine, methyldiethanolamine, butyldiethanolamine and/or methyldiisopropanolamine, with triethanolamine being especially preferred.

In the process of the invention, the amount of the at least one polyol B is advantageously selected such that the molar ratio of the carboxyl groups of the at least one polycarboxylic acid A to the hydroxyl groups of the at least one polyol B is in the range ≥0.1 and ≤10, advantageously in the range ≥1 and ≤8, and especially advantageously in the range ≥2 and ≤6.

In one preferred embodiment, use is made as polyol B of an alkanolamine, preferably triethanolamine, the amount being calculated such that it is ≥10 and ≤50 wt % and advantageously ≥15 and ≤35 wt %, based in each case on the amount of polycarboxylic acid A.

Phosphorus-comprising reaction accelerators are disclosed in particular in EP-A 583086, page 6, lines 18 to 26, and in EP-A 651088, page 5, lines 30 to 39. As a result of being referenced expressly, the phosphorus compounds disclosed in the two specifications are to be regarded as phosphorus compounds C disclosed in the present specification. They are, more particularly, alkali metal hypophosphites, phosphites, polyphosphates, and dihydrogen phosphates, polyphosphoric acid, hypophosphoric acid, phosphoric acid, alkylphosphinic acid, or oligomers and/or polymers of these salts and acids. With particular advantage, however, sodium hypophosphite and/or sodium hypophosphite monohydrate are used as phosphorus compound C in the present invention.

The amount of the at least one phosphorus compound C here is ≥0.1 and ≤40 wt %, preferably ≥3 and ≤20 wt %, and very preferably ≥5 and ≤15 wt %, based in each case on the amount of polycarboxylic acid A; for the purposes of this specification, the amount of polycarboxylic acid A is to correspond to the sum total of the total amounts of the monomers A1 and monomers A2 used in preparing the corresponding amount of polycarboxylic acid A.

In accordance with the invention, the total amount of the at least one phosphorus compound C may be added to the polycarboxylic acid solution with homogeneous mixing. In this case, the total amount of polyol B is added to the aqueous mixture of polycarboxylic acid A and phosphorus compound C, and mixing takes place homogeneously. In a further embodiment, first the polycarboxylic acid solution and the polyol B are mixed homogeneously, and the phosphorus compound C is thereafter added to this mixture with homogeneous mixing. In another embodiment, the phosphorus compound C may be added during the mixing of polycarboxylic acid solution and polyol B. Hybrid forms of the aforementioned embodiments are of course also possible. For example, a part of the polyol B may be added to the total amount of the polycarboxylic acid solution, and the remaining portion of the polyol B may be metered in together with the total amount of the phosphorus compound C to this mixture, with homogeneous mixing. Preferably, however, the total amount of the at least one phosphorus compound C is added to the polycarboxylic acid solution before mixing with the polyol B takes place.

The temperature at which the mixing operations take place is not critical per se and is situated in general in the range ≥10 and ≤50° C., advantageously in the range ≥20 and ≤30° C. and more particularly at room temperature (20 to 25° C.).

It is important that the aqueous binders obtainable by the process of the invention may further comprise auxiliaries typical of the application, such as, for example, pigments, fillers, coalescers, surfactants, biocides, plasticizers, antifoams, corrosion inhibitors, antistats, acids, bases, buffer substances, lubricants, antioxidants, silane coupling reagents, etc., which is why the intention in accordance with the invention is to encompass not only the unadditized aqueous binders but also those which have been additized.

The aforementioned aqueous binders are suitable advantageously for use as binders for fibrous and/or granular substrates. With advantage, therefore, the stated aqueous binders can be used for producing shaped articles made from fibrous and/or granular substrates.

Granular and/or fibrous substrates are familiar to the skilled person. They are, for example, wood chips, wood fibers, cellulose fibers, textile fibers, polymeric fibers, glass fibers, mineral fibers or natural fibers such as jute, flax, hemp or sisal, but also cork chips, sand, and also other organic or inorganic, natural and/or synthetic, granular and/or fibrous compounds whose longest dimension in the case of granular substrates is ≤10 mm, preferably ≤5 mm, and more particularly ≤2 mm. As will be appreciated, the term "substrate" is also intended to comprise the fiber webs obtainable from fibers, such as, for example, so-called mechanically consolidated fiber webs (needled, for example), or chemically prebonded fiber webs, bonded with melamine/formaldehyde resins, for example. With particular advantage, the aqueous binder of the invention is suitable as a formaldehyde-free binder system for the aforementioned fibers and/or fiber webs formed from them, particular preference being given to the fiber webs.

The process for producing a shaped article from a granular and/or fibrous substrate and the aforementioned aqueous binder advantageously comprises applying the aqueous binder of the invention uniformly to the granular and/or fibrous substrate (by impregnation), optionally shaping the granular and/or fibrous substrate impregnated with the aqueous binder, and then subjecting the impregnated granular and/or fibrous substrate to a thermal treatment step at a temperature ≥110° C.

The treatment (impregnation) of the granular and/or fibrous substrate with the aqueous binder of the invention generally takes the form of the aqueous binder of the invention being applied uniformly to the surface of the granular and/or fibrous substrate. The amount of aqueous binder in this case is selected such that ≥0.1 g and ≤100 g, preferably ≥1 g and ≤50 g, and especially preferably ≥5 g and ≤30 g of binder, formed from the sum total of the total amounts of polycarboxylic acid A, polyol B, and phosphorus compound C (reckoned as solids), are used per 100 g of granular and/or fibrous substrate. Impregnation of the granular and/or fibrous substrate is familiar to the skilled person and is accomplished for example by drenching or by spraying the granular and/or fibrous substrate.

After impregnation, the granular and/or fibrous substrate is optionally brought into the desired shape, by being introduced into a heatable press or mold, for example. After that, the shaped, impregnated granular and/or fibrous substrate is dried and cured in a manner familiar to the skilled person.

Drying and/or curing of the optionally shaped, impregnated granular and/or fibrous substrate takes place frequently in two temperature stages, with the drying stage taking place at a temperature <110° C., preferably ≥20° C. and ≤100° C., and especially preferably ≥40 and ≤100° C., and the curing stage taking place at a temperature ≥110° C., preferably ≥130 and ≤250° C. or ≥160 and ≤220° C., and especially preferably ≥170° C. and ≤210° C.

The character of the drying stage is advantageously such that drying is continued at a temperature <100° C. until the shaped, impregnated granular and/or fibrous substrate, which frequently does not as yet have its ultimate shape (and is referred to as a prepreg), has a residual moisture content ≤30 wt %, preferably ≤15 wt %, and especially preferably ≤10 wt %. The residual moisture content here is generally determined by weighing approximately 1 g of the resulting prepreg at room temperature, subsequently drying it at 110° C. for 2 minutes, and subsequently cooling it and reweighing it at room temperature. The residual moisture content in this case corresponds to the difference in weight of the prepreg before and after the drying procedure at 110° C., based on the weight of the prepreg before the drying procedure, multiplied by a factor of 100.

The resulting prepreg is still formable after heating to a temperature of up to around 100° C., and can be brought at this temperature into the ultimate form of the desired shaped article.

The subsequent curing stage takes place advantageously by the prepreg being heated at a temperature ≥110° C. until it has a residual moisture content ≤2 wt %, preferably ≤1 wt % or ≤0.5 wt %, and especially preferably ≤0.1 wt %, with the binder curing as a result of a chemical esterification reaction.

The shaped articles are frequently produced by bringing the prepreg into the ultimate shape in a molding press, in the temperature ranges stated above, and subsequently carrying out curing.

It is of course also possible, however, for the drying stage and the curing stage of the shaped articles to take place in one operation, in a molding press, for example.

The aqueous binder obtainable by the process of the invention has no propensity or a significantly reduced propensity to clouding and has no hydrogen sulfide odor or one which is significantly reduced. At the same time, the shaped articles produced with the aqueous binders of the invention do not exhibit any detractions from their mechanical properties.

The invention is to be elucidated using nonlimiting examples below.

EXAMPLES

Methods Employed

The solids contents were generally determined by drying a defined amount of the polycarboxylic acid solution (approximately 1.0 g) in a forced-air drying cabinet at a temperature of 120° C. for 2 hours and then reweighing it at room temperature. Two measurements were conducted in each case. The FIGURE reported in the respective examples represents the mean of these measurements.

The viscosities were determined generally by the Brookfield method (ISO 2555, 1989) at 23 C.

The pH values were determined using a calibrated Knick Portamess pH meter (type 911) at room temperature.

The sulfite contents were determined by titration with a 0.01 M aqueous iodine solution. This was done by diluting 10.0 g of the solution under investigation with 50 ml of deionized water in a 250 ml conical flask, adding about 1 ml of a 1 wt % strength aqueous starch solution, and then carrying out titration with the iodine solution.

The hydrogen sulfide contents were determined by diluting approximately 15 to 20 g of the solution under investigation with 100 ml of deionized water at room temperature and then mixing the diluted solution with 10 ml of a 1-molar aqueous sodium hydroxide solution. After that, this mixture was titrated potentiometrically with a 0.01-molar aqueous silver nitrate solution against a silver Titrode (6.0430.100) from Metrohm, USA.

The molecular weight determination was made using two TSKgel G3000PWxl columns connected in series (length: 30 cm, internal diameter: 7.8 mm) from Tosoh Bioscience LLC at a temperature of 35° C., with an eluent (deionized water with 0.01 mol/l phosphate buffer, pH 7.4, and 0.01 mol/l NaN3), a flow rate of 0.5 ml per minute, an injection quantity of 100 μl, a concentration of the injected solution of 1 to 2 mg per ml, and with a DRI detector from Agilent Technologies GmbH.

A corresponding calibration plot was compiled using the sodium polyacrylate salt standards with a molecular weight peak (Mp) of 900 g/mol and 1770 g/mol, from American Polymer Standards Corporation, and 1250 g/mol, 2925 g/mol, 7500 g/mol, 16 000 g/mol, 28 000 g/mol, and 82 900 g/mol from Polymer Standards Service GmbH (software from Polymer Standards Service GmbH). Using the calibration plot, the corresponding number-average molecular weights (Mn) and weight-average molecular weights (Mw) of the samples obtained were then determined.

Polycarboxylic Acid 1

A 2 l glass reactor equipped with a stirrer, a reflux condenser, and metering facilities was charged at room temperature and under a nitrogen atmosphere with 340 g of deionized water, and this initial charge was heated under atmospheric pressure and with stirring to 95° C. After this temperature had been reached, a mixture of 800 g of acrylic acid and 85 g of deionized water was metered in over the course of 4 hours, 400 g of a 40 wt % strength aqueous solution of sodium hydrogen sulfite was metered in to the reaction vessel likewise over the course of 4 hours, and 343 g of a 7 wt % strength aqueous solution of sodium persulfate was metered in over the course of 4.25 hours, the metered feeds beginning simultaneously and taking place continuously with constant volume flow rates and with stirring and maintenance of the aforementioned temperature. The polymerization mixture was subsequently allowed to continue polymerization for an hour at the aforementioned temperature, after which it was cooled to room temperature. The aqueous polyacrylic acid solution obtained had a pH of 1.96 and a solids content of 52.0 wt %. The viscosity was found to be 94 mPas (spindle 2, 60 rpm, 23° C.). The sodium hydrogen sulfite content was found to be 0.49 wt %. The number-average molecular weight Mn of the polyacrylic acid obtained was 1620 g/mol, and the weight-average molecular weight Mw was 2840 g/mol.

The aqueous polyacrylic acid solution thus obtained was used to implement the following investigations:

a) Direct Additions of Sodium Hypophosphite Monohydrate

A 1 l glass reactor equipped with a stirrer and metering facilities was charged at room temperature with 515 g of the polyacrylic acid obtained. Subsequently, 55 g of a 59 wt % strength aqueous solution of sodium hypophosphite monohydrate were metered in with stirring over the course of 10 minutes. The resulting reaction mixture was then left with stirring for a further 5 minutes. During this time, a slightly yellow, homogeneous clouding developed. 48.6 g of this cloudy mixture were withdrawn, and the solid formed in this sample was separated from the liquid phase by ultracentrifugation (3 hours/50 000 rpm). The quantity of solid was weighed and found to be 71 mg. The sulfur content in the solid was determined by elemental analysis as being 97 wt %. The clear solution obtained after the ultracentrifugation comprised an additional 60 ppm of hydrogen sulfide ($H_2S$), and the sodium hydrogen sulfite content was found to be 0.015 wt %.

b) Addition of Sodium Hypophosphite Monohydrate after Reduction of the Amount of Hydrogen Sulfite A 1 l glass reactor equipped with a stirrer, a reflux condenser, and metering facilities was charged at room temperature and under a nitrogen atmosphere with 587 g of the polyacrylic acid obtained, and 2.5 g of a 50 wt % strength aqueous hydrogen peroxide solution were added. The resulting mixture was stirred at room temperature for 15 minutes. Then 58 g of a 59 wt % strength aqueous solution of sodium hypophosphite monohydrate were metered in with stirring over the course of 10 minutes. The reaction mixture obtained was then left to continue stirring for 5 minutes more. The polyacrylic acid solution obtained in this case showed no clouding at all. Nor was it possible to detect any hydrogen sulfide.

Polycarboxylic Acid 2

The preparation of polycarboxylic acid 2 was analogous to the preparation of polycarboxylic acid 1, with the difference that 200 g rather than 400 g of a 40 wt % strength aqueous solution of sodium hydrogen sulfite were used, and that the acrylic acid/water mixture and 125 g rather than 85 g of deionized water were used.

The aqueous polyacrylic acid solution obtained had a pH of 1.45 and a solids content of 52.0 wt %. The viscosity was found to be 317 mPas (spindle 2, 60 rpm, 23° C.). The sodium hydrogen sulfite content was found to be 0.42 wt %. The number-average molecular weight Mn of the polyacrylic acid obtained was 2840 g/mol, and the weight-average molecular weight Mw was 6360 g/mol.

From the polyacrylic acid solution obtained, seven samples each of 25.0 g were taken and were transferred into closeable 50 ml measuring cylinders. At room temperature, these samples were admixed with the quantity stated in table 1 of a 59 wt % strength aqueous sodium hypophosphite monohydrate solution, followed by homogeneous mixing and then by storage at room temperature. The observations made as a function of the time are summarized in table 1.

TABLE 1

Effect of the amount of sodium hypophosphite monohydrate

| Amount of sodium hypophosphite monohydrate solution [in g] | Observations |
| --- | --- |
| 0.059 | Mixture remained clear after addition of the sodium hypophosphite; after 24 hours a slight clouding was ascertained; even after 40 days no $H_2S$ odor was perceptible |
| 0.117 | Mixture remained clear after addition of the sodium hypophosphite; after 14 hours clouding was ascertained; even after 40 days no $H_2S$ odor was perceptible |

TABLE 1-continued

Effect of the amount of sodium hypophosphite monohydrate

| Amount of sodium hypophosphite monohydrate solution [in g] | Observations |
|---|---|
| 0.237 | Mixture remained clear after addition of the sodium hypophosphite; after 4 hours clouding was ascertained; even after 40 days no $H_2S$ odor was perceptible |
| 0.470 | Mixture became cloudy immediately on addition of the sodium hypophosphite; after 36 days an $H_2S$ odor was perceptible |
| 1.174 | Mixture became cloudy immediately on addition of the sodium hypophosphite; after 29 days an $H_2S$ odor was perceptible |
| 2.348 | Mixture became cloudy immediately on addition of the sodium hypophosphite; after 17 days an $H_2S$ odor was perceptible |
| 7.044 | Mixture became cloudy immediately on addition of the sodium hypophosphite; after 4 days an $H_2S$ odor was perceptible |

From table 1 it is evident that on addition even of very small amounts of sodium hypophosphite monohydrate (0.3 wt % based on the polyacrylic acid), the polyacrylic acid solution develops clouding.

Polycarboxylic Acid 3

An aqueous solution of an acrylic acid/maleic acid copolymer (weight ratio 70:30) was prepared in accordance with example 2 of EP-A 75820, using hydrogen peroxide as radical initiator, at 110° C. After that, the polymerization mixture was heated to 120° C., stirred at that temperature for 2 hours, and then cooled to room temperature.

The resulting aqueous copolymer solution had a pH of 1.0 and a solids content of 45.1 wt %. The viscosity was found to be 101 mPas (spindle 2, 60 rpm, 23° C.). The number-average molecular weight Mn of the resulting copolymer was 1560 g/mol, and the weight-average molecular weight Mw was 8510 g/mol.

From this copolymer solution, which by virtue of its preparation comprised no hydrogen sulfite at all, 43.1 g samples were taken at room temperature in each case and transferred into closeable 50 ml measuring cylinders. These samples were admixed at room temperature with the amounts of sodium hydrogen sulfite indicated in table 3, in the form of a 40 wt % strength aqueous solution, and were mixed homogeneously. Thereafter these samples, likewise at room temperature, were admixed in each case with 4.08 g of a 59 wt % strength aqueous sodium hypophosphite monohydrate solution, and were likewise mixed homogeneously. The changes observed as a function of time are listed in table 3.

TABLE 3

Effect of the amount of sodium hydrogen sulfite on the clouding behavior and the evolution of hydrogen sulfide

| Amount of sodium hydrogen sulfite solution [in mg] | Corresponding to a sodium hydrogen sulfite content [in ppm] | Observations |
|---|---|---|
| 21.6 | 200 | After 40 days, no clouding and no $H_2S$ odor were perceptible |
| 53.9 | 500 | After 40 days, no clouding and no $H_2S$ odor were perceptible |
| 107.8 | 1000 | After 40 days, no clouding and no $H_2S$ odor were perceptible |
| 129.3 | 1200 | After 7 days, a slight $H_2S$ odor was perceptible, no clouding after 40 days |
| 161.6 | 1500 | After 3 days, a slight $H_2S$ odor was perceptible, no clouding after 40 days |
| 215.5 | 2000 | After 1 day, an $H_2S$ odor was perceptible, no clouding after 40 days |
| 431.0 | 4000 | After 2.5 hours, both clouding and $H_2S$ odor perceptible |
| 646.5 | 6000 | After 1 hour, both clouding and $H_2S$ odor perceptible |

What is claimed is:

1. A process for producing an aqueous binder that comprises at least one polycarboxylic acid A, at least one organic compound B which comprises at least two hydroxyl groups (polyol B), and at least one phosphorus compound C, the method comprising:
    carrying out radical polymerization of
        ≥50 and ≤100 parts by weight of at least one α,β-monoethylenically unsaturated monocarboxylic or dicarboxylic acid and/or an anhydride thereof (monomer A1), and
        ≥0 and ≤50 parts by weight of at least one other ethylenically unsaturated compound (monomer A2), which is copolymerizable with the monomer A1,
        wherein a total amount of each of the monomers A1 and A2 add up to 100 parts by weight [total monomer amount], in an aqueous medium in the presence of ≥0.5 and ≤50 wt % of at least one inorganic hydrogen sulfite salt, based on the total monomer amount, to give the polycarboxylic acid A, and thereafter
    in the aqueous solution of the polycarboxylic acid A obtained (polycarboxylic acid solution), reducing an amount of free, unreacted hydrogen sulfite, calculated as sodium hydrogen sulfite ($NaHSO_3$), to an amount ≤1000 ppm, based on the polycarboxylic acid solution, and only thereafter
    adding the phosphorus compound C either to the polycarboxylic acid solution, to the mixture of polycarboxylic acid solution and polyol B, and/or during the mixing of polycarboxylic acid solution and polyol B.

2. The process according to claim 1, wherein the reducing takes place at a pH<5.

3. The process according to claim 1, wherein an amount of the at least one phosphorus compound C is ≥0.1 and ≤40 wt %, based on an amount of the polycarboxylic acid A.

4. The process according to claim 1, wherein an amount of the inorganic hydrogen sulfite salt is selected such that the resulting polycarboxylic acid A has a weight-average molecular weight of ≤80 000 g/mol.

5. The process according to claim 1, wherein the monomer A1 is selected from acrylic acid, methacrylic acid, maleic acid, maleic anhydride and/or itaconic acid, and the monomer A2 is selected from methyl acrylate, ethyl acrylate, n-butyl acrylate, 2-ethylhexyl acrylate, methyl methacrylate and/or styrene.

6. The process according to claim 1, wherein the inorganic hydrogen sulfite salt is sodium hydrogen sulfite.

7. The process according to claim 1, wherein the free inorganic hydrogen sulfite is reduced by an oxidizing agent.

8. The process according to claim 7, wherein the free inorganic hydrogen sulfite is reduced by hydrogen peroxide.

9. The process according to claim 1, wherein the phosphorus compound C is sodium hypophosphite and/or sodium hypophosphite monohydrate.

10. The process according to claim 1, wherein a total amount of the phosphorus compound C is added to the polycarboxylic acid solution before the mixing with the polyol B.

11. The process according to claim 1, wherein an amount of the at least one polyol B is selected such that a molar ratio of the carboxyl groups of the at least one polycarboxylic acid A to the hydroxyl groups of the at least one polyol B is in a range of $\geq 0.1$ and $\leq 10$.

12. The process according to claim 1, wherein the polyol B is an alkanolamine.

13. The process according to claim 12, wherein an amount of the alkanolamine is $\geq 10$ and $\leq 50$ wt %, based on a total amount of the polycarboxylic acid A.

14. The process according to claim 12, wherein the alkanolamine is selected from diethanolamine, triethanolamine, diisopropanolamine, triisopropanolamine, methyldiethanolamine, butyldiethanolamine and/or methyldiisopropanolamine.

15. An aqueous binder obtained by the process according to claim 1.

16. A shaped article comprising a granular and/or fibrous substrate and the binder according to claim 15.

17. A process for producing a shaped article from a granular and/or fibrous substrate, comprising applying the aqueous binder according to claim 15 to the granular and/or fibrous substrate, and then subjecting the treated granular and/or fibrous substrate to a thermal treatment at a temperature of $\geq 110°$ C.

18. The process according to claim 17, wherein the aqueous binder is applied in an amount of $\geq 0.1$ g and $\leq 100$ g (calculated as the sum total of the total amounts of polycarboxylic acid A, polyol B, and phosphorus compound C, based on solids) per 100 g of the granular and/or fibrous substrate.

19. A shaped article obtained by the process according to claim 17.

* * * * *